(12) United States Patent
Abe et al.

(10) Patent No.: US 11,768,056 B2
(45) Date of Patent: Sep. 26, 2023

(54) OPTICAL SIGHT

(71) Applicant: LIGHT OPTICAL WORKS, LTD., Nagano (JP)

(72) Inventors: Takashi Abe, Nagano (JP); Kensuke Sakai, Nagano (JP)

(73) Assignee: LIGHT OPTICAL WORKS, LTD., Nagano (JP)

( * ) Notice: Subject to any disclaimer, the term of this patent is extended or adjusted under 35 U.S.C. 154(b) by 314 days.

(21) Appl. No.: 17/423,462

(22) PCT Filed: Feb. 5, 2019

(86) PCT No.: PCT/JP2019/003938
§ 371 (c)(1),
(2) Date: Jul. 15, 2021

(87) PCT Pub. No.: WO2020/161781
PCT Pub. Date: Aug. 13, 2020

(65) Prior Publication Data
US 2022/0120532 A1    Apr. 21, 2022

(51) Int. Cl.
*F41G 1/38*    (2006.01)
*G02B 7/02*    (2021.01)
*G02B 23/06*   (2006.01)

(52) U.S. Cl.
CPC ............ *F41G 1/38* (2013.01); *G02B 7/02* (2013.01); *G02B 23/06* (2013.01)

(58) Field of Classification Search
CPC .. F41G 1/38; G02B 7/02; G02B 23/16; G02B 7/025; G02B 7/026; G02B 7/021; G02B 23/14
See application file for complete search history.

(56) References Cited

U.S. PATENT DOCUMENTS 3,464,758 A * 9/1969 Giwosky ............... G02B 23/16
                                                    359/424
4,136,956 A * 1/1979 Eichweber .............. F41A 33/02
                                                    356/153

(Continued)

FOREIGN PATENT DOCUMENTS

JP    2001133697    5/2001
JP    2008539388    11/2008

OTHER PUBLICATIONS

Office Action of Japan Counterpart Application, with English translation thereof, dated Jun. 21, 2022, pp. 1-8.

(Continued)

*Primary Examiner* — Michael D David
(74) *Attorney, Agent, or Firm* — JCIPRNET

(57) ABSTRACT

Provided is an optical sight having a lens frame and multiple fixing members for fixing an objective lens to an inside of a barrel body. The objective lens is held on an inner peripheral surface of a lens frame. A male screw, which can be screwed into a female screw arranged on the inner peripheral surface of a barrel body, is arranged on an outer peripheral surface of the lens frame. Multiple through-holes are formed at a wall section of the lens frame corresponding to the outer peripheral surface of the objective lens along a circumferential direction of the wall section. The fixing member is made of metal or synthetic resin having a hardness lower than that of the barrel body. An assembly including the objective lens, the lens frame, and the fixing members is screwed into the female screw arranged on the inner peripheral surface of the barrel body.

8 Claims, 5 Drawing Sheets

(56) References Cited

U.S. PATENT DOCUMENTS

| | | | | |
|---|---|---|---|---|
| 4,200,355 A * | 4/1980 | Williams, Jr. | G02B 23/14 42/122 |
| 4,266,873 A | 5/1981 | Hacskaylo et al. | |
| 4,408,842 A | 10/1983 | Gibson | |
| 4,554,744 A * | 11/1985 | Huckenbeck | F41G 1/38 42/123 |
| 4,643,542 A * | 2/1987 | Gibson | F41G 1/38 359/427 |
| 6,005,711 A * | 12/1999 | Mai | G02B 7/10 359/425 |
| 7,173,237 B2 * | 2/2007 | Palmer | G02B 23/12 250/214 LA |
| 7,581,852 B2 * | 9/2009 | Kennedy | F21V 33/0052 362/253 |
| 7,827,723 B1 * | 11/2010 | Zaderey | G02B 23/10 42/122 |
| 8,335,413 B2 * | 12/2012 | Dromaretsky | G02B 6/351 385/36 |
| 8,467,430 B2 * | 6/2013 | Caffey | H01S 5/141 372/98 |
| 9,182,773 B2 * | 11/2015 | Campean | G05G 1/082 |
| 10,254,082 B2 * | 4/2019 | Sammut | F41G 3/08 |
| 2015/0168665 A1 | 6/2015 | Farmiga | |
| 2021/0247055 A1 * | 8/2021 | Abe | G02B 7/02 |
| 2022/0120532 A1 * | 4/2022 | Abe | G02B 7/021 |
| 2022/0229281 A1 * | 7/2022 | Sakai | G02B 23/16 |

OTHER PUBLICATIONS

"International Search Report (Form PCT/ISA/210) of PCT/JP2019/003938", dated May 14, 2019, with English translation thereof, pp. 1-3.

* cited by examiner

OPTICAL SIGHT

CROSS-REFERENCE TO RELATED APPLICATION

This application is a 371 application of the international PCT application serial no. PCT/JP2019/003938, filed on Feb. 5, 2019. The entirety of the above-mentioned patent applications is hereby incorporated by reference herein and made a part of this specification.

TECHNICAL FIELD

The present invention relates to an optical sight for sighting at a target.

RELATED ART

FIG. 1 is a schematic view showing a configuration of a general optical sight 1. The optical sight 1 is, for example, a rifle scope, and is mounted on a rifle (not shown). The optical sight 1 includes an objective lens 20, an upright lens 30, a reticle 40, and an eyepiece lens 50 on an optical axis A in a lens barrel 10.

The reticle 40 is arranged at a position conjugate with an inverted image of the objective lens 20, and is arranged at a position coincident with an upright image of the upright lens 30. The reticle 40 displays a line of sight (not shown). The line of sight is superimposed on the upright image of the upright lens 30. A user of the optical sight 1 can observe in a manner of superimposing the line of sight on an upright image of an object (target) through the eyepiece lens 50.

FIG. 4 is a partial cross-sectional view showing an internal structure of the optical sight 1 on the objective lens 20 side. As shown in FIG. 4, the lens barrel 10 is configured by a barrel body 11 and an end tube 12. The objective lens 20 is configured by, for example, three lenses 21 to 23. The first lens 21 and the second lens 22 are bonded together by an adhesive to constitute a first lens group. One third lens 23 constitutes a second lens group. This objective lens 20 is fixed to an inside of a lens frame 24 in cylindrical shape. FIG. 5 and FIG. 6 show an assembly in which the objective lens 20 and other components are fixed to the inside of the lens frame 24.

As shown in FIG. 5, three first male screws 24a and one second male screw 24b are arranged on an outer peripheral surface of the lens frame 24. The second male screw 24b is located at a front end section of the lens frame 24. A concave groove is formed at a rear of the second male screw 24b. An O-ring 27a shown in FIG. 4 is attached to the concave groove. The three first male screws 24a are located between the rear of the concave groove and a rear end section of the lens frame 24. Two intervals having different widths are formed between the three first male screws 24a. Four first elongated holes 160a are evenly formed with a change in the position by 90° in the wider interval which is located at the front. Four second elongated holes 160b are evenly formed with a change in the position by 90° in the narrower interval which is located at the rear. The first elongated hole 160a is larger than the second elongated hole 160b. An adhesive 160 for fixing the first lens 21 and the second lens 22 to the inner peripheral surface of the lens frame 24 is injected into the first elongated hole 160a. The adhesive 160 injected into the first elongated hole 160a flows between the outer peripheral surface of the second lens 22 and the inner peripheral surface of the lens frame 24. On the other hand, the adhesive 160 for fixing the third lens 23 to the inner peripheral surface of the lens frame 24 is injected into the second elongated hole 160b. The adhesive 160 injected into the second elongated hole 160b flows between the outer peripheral surface of the third lens 23 and the inner peripheral surface of the lens frame 24.

As shown in FIG. 6, the lens frame 24 has an inner diameter substantially the same as outer diameters of the first lens 21, the second lens 22, and the third lens 23. The first lens 21 and the second lens 22 are fixed to the front inner peripheral surface of the lens frame 24. A contact section with the first lens 21 is arranged on the front inner peripheral surface of the lens frame 24. An O-ring 27b is interposed between the contact section and the first lens 21. The third lens 23 is fixed to the rear of the second lens 22 on the inner peripheral surface of the lens frame 24. An interval tube 25 is interposed between the second lens 22 and the third lens 23. The interval tube 25 forms an interval having a predetermined width between the second lens 22 and the third lens 23. Furthermore, a pressing tube 26 is fixed to the rear of the third lens 23 on the inner peripheral surface of the lens frame 24. A male screw 26a is arranged on the outer peripheral surface of the pressing tube 26. On the other hand, a female screw 24c is arranged at a rear end section on the inner peripheral surface of the lens frame 24. The male screw 26a of the pressing tube 26 is screwed into the female screw 24c of the lens frame 24. The pressing tube 26 presses the first lens 21, the second lens 22, the third lens 23, and the interval tube 25 forward and fixes the first lens 21, the second lens 22, the third lens 23, and the interval tube 25 to the inside of the lens frame 24. An adhesive (not shown) is injected between the male screw 26a of the pressing tube 26 and the female screw 24c of the lens frame 24 for maintaining mutual screwing.

As shown in FIG. 4, the lens frame 24 constituting the assembly of the objective lens 20 (see FIG. 5 and FIG. 6) is fixed to a front end section of the barrel body 11. A female screw 11a is arranged on the inner peripheral surface of the front end section of the barrel body 11. The first male screw 24a of the lens frame 24 is screwed into the female screw 11a of the barrel body 11. An adhesive (not shown) is injected between the first male screw 24a of the lens frame 24 and the female screw 11a of the barrel body 11 for maintaining mutual screwing. Furthermore, the end tube 12 is fixed to the front end section of the lens frame 24. A female screw 12a is arranged on the inner peripheral surface of the end tube 12. The female screw 12a of the end tube 12 is screwed into the second male screw 24b of the lens frame 24. When the end tube 12 and the lens frame 24 are screwed together, a rear end surface of the end tube 12 comes into contact with a front end surface of the barrel body 11. Thereby, a repulsive force is generated between the rear end surface of the end tube 12 and the front end surface of the barrel body 11. The coupling between the lens frame 24 and the barrel body 11 and the coupling between the lens frame 24 and the end tube 12 are respectively firmly maintained by the repulsive force. An adhesive (not shown) is injected between the second male screw 24b of the lens frame 24 and the female screw 12a of the end tube 12 for maintaining mutual screwing.

LITERATURE OF RELATED ART

Patent Literature

Patent literature 1: Japanese Unexamined Patent Publication No. 2008-539388

SUMMARY

Problems to be Solved

<Position Deviation of Objective Lens>

The objective lens 20 shown in FIG. 4 is fixed to the lens frame 24, but is not fixed to the barrel body 11. Therefore, there is a problem that when the optical sight 1 shown in FIG. 1 receives an impact in a diameter direction of the objective lens 20, the position of the objective lens 20 is slightly deviated in the diameter direction. If the center of the objective lens 20 deviates from the optical axis A, the position of the inverted image formed by the objective lens 20 is also deviated. As a result, the positions of the upright image formed by the upright lens 30 and the line of sight of the reticle 40 are also deviated. The slight position deviation of the objective lens 20 greatly dislocates a distant impact point.

For example, a recoil when a firearm is shot gives the optical sight 1 an impact in the diameter direction of the objective lens 20. An impact value when a rifle with a large diameter is shot may be 1000 G (1 G=9.80665 m/s$^2$) or more. In addition, when the firearm is placed sideways, the optical sight 1 also receives the impact in the diameter direction of the objective lens 20. The position of the objective lens 20 is slightly deviated due to the impact in the diameter direction.

A cause of the position deviation of the objective lens 20 is a fixed structure of the objective lens 20 shown in FIG. 4. The first lens 21, the second lens 22, and the third lens 23 are fixed to the lens frame 24, but are not fixed to the barrel body 11. Besides, a slight first clearance is arranged between the outer peripheral surfaces of the first lens 21, the second lens 22 and the third lens 23 and the inner peripheral surface of the lens frame 24. The first clearance is necessary to put the first lens 21, the second lens 22 and the third lens 23 into the lens frame 24. Furthermore, a slight second clearance is also arranged between the first male screw 24a of the lens frame 24 and the female screw 11a of the barrel body 11. The second clearance is necessary to screw the first male screw 24a and the female screw 11a. The first lens 21, the second lens 22 and the third lens 23 may be slightly deviated within a range of the first and second clearances due to the impact in the diameter direction.

<Precision of Screw>

The first male screw 24a of the lens frame 24 and the female screw 11a of the barrel body 11 are required to have an extremely high precision. As described above, the second clearance is arranged between the first male screw 24a and the female screw 11a. The second clearance is necessary to be minimized because the second clearance causes the position deviation of the objective lens 20. Therefore, the first male screw 24a and the female screw 11a must be manufactured by actual parts matching. That is, a specified barrel body 11 and a specified lens frame 24 are paired to modify the female screw 11a of the specified barrel body 11 and/or the first male screw 24a of the specified lens frame 24, and minimize the second clearance. The actual parts matching of the first male screw 24a and the female screw 11a requires labor, time, and skill in processing, and significantly reduces production efficiency of the optical sight 1. Furthermore, even if the second clearance can be minimized, the objective lens 20 may be deviated within the range of the second clearance.

<Management of Adhesive>

It is difficult to manage the adhesive 160 shown in FIG. 5. That is, the adhesive 160 is injected into the first elongated hole 160a and the second elongated hole 160b formed on the outer peripheral surface of the lens frame 24. The first elongated hole 160a and the second elongated hole 160b are located between two first male screws 24a. Therefore, the adhesive 160 injected into the first elongated hole 160a and the second elongated hole 160b is likely to be adhered to the first male screw 24a. The adhesive 160 adhered to the first male screw 24a hinders the screwing with the female screw 11a, and makes the precision of the screw obtained by the actual parts matching meaningless.

Purpose of Invention

The present invention has been made in view of the above problems, and aims to provide an optical sight capable of effectively preventing the position deviation of the objective lens in the diameter direction and significantly improving manufacturing efficiency.

Means to Solve Problems (1) In order to achieve the above purpose, an optical sight of the present invention includes an objective lens, an upright lens, a reticle, and an eyepiece lens on an optical axis in a lens barrel, and further includes a lens frame in cylindrical shape and a plurality of fixing members, configured for fixing the objective lens to an inside of the lens barrel, wherein an inner peripheral surface of the lens frame is capable of coming into contact with an outer peripheral surface of the objective lens to hold the objective lens; a male screw capable of being screwed into a female screw arranged on the inner peripheral surface of the lens barrel is arranged on the outer peripheral surface of the lens frame; a plurality of through-holes is formed at a wall section of the lens frame corresponding to the outer peripheral surface of the objective lens along a circumferential direction of the wall section; each of the plurality of fixing members is made of a metal or synthetic resin having a hardness lower than that of the lens barrel, and has a shape such that the fixing member is capable of being put into the through-hole and a height such that the fixing member is capable of being projected from the through-hole; and an assembly including the objective lens, the lens frame, and the plurality of fixing members is screwed into the female screw arranged on the inner peripheral surface of the lens barrel.

(2) Preferably, in the optical sight of the above (1), at least three or more of the through-holes are arranged at equal intervals along the circumferential direction of the wall section of the lens frame.

(3) Preferably, in the optical sight of the above (1) or (2), a cross-sectional shape of the through-hole is a circle, and a shape of the fixing member is a sphere having a diameter substantially the same as an inner diameter of the through-hole.

(4) Preferably, in the optical sight of the above (1) to (3), a grease configured for holding the fixing member in the through-hole is further included.

Effect

According to the optical sight of the present invention, it is possible to effectively prevent the position deviation of the objective lens in the diameter direction, and significantly improve the manufacturing efficiency.

DESCRIPTION OF THE EMBODIMENTS

Figure 1:
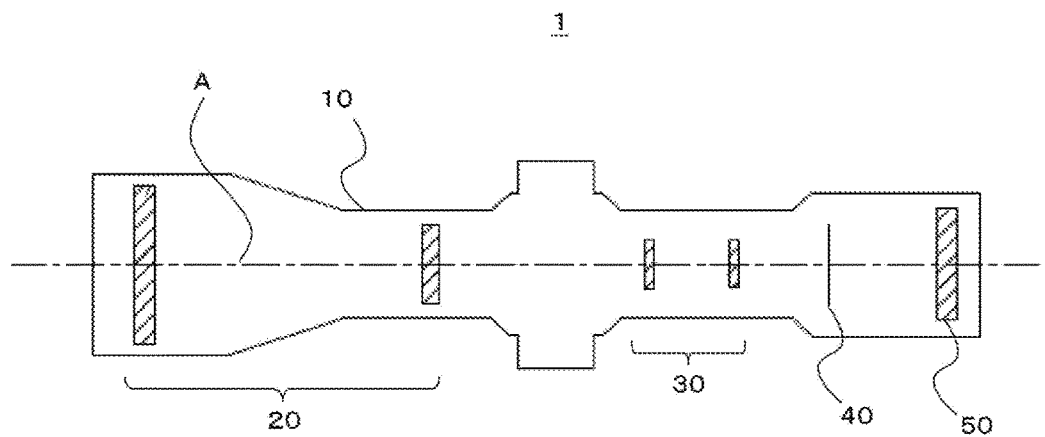
FIG. 1 is a schematic view showing a configuration of a general optical sight.

Hereinafter, an optical sight according to an embodiment of the present invention is described with reference to FIG. 2 and FIG. 3. Moreover, in the embodiment, the same configurations as those of a conventional art in FIG. 1, and FIG. 4 to FIG. 6 are designated by the same reference signs, and detailed description thereof is omitted. An optical sight 1 of the embodiment is, for example, a rifle scope shown in FIG. 1, and includes an objective lens 20, an upright lens 30, a reticle 40, and an eyepiece lens 50 on an optical axis A in a lens barrel 10.

<Characteristics of Optical Sight>

Figure 2:
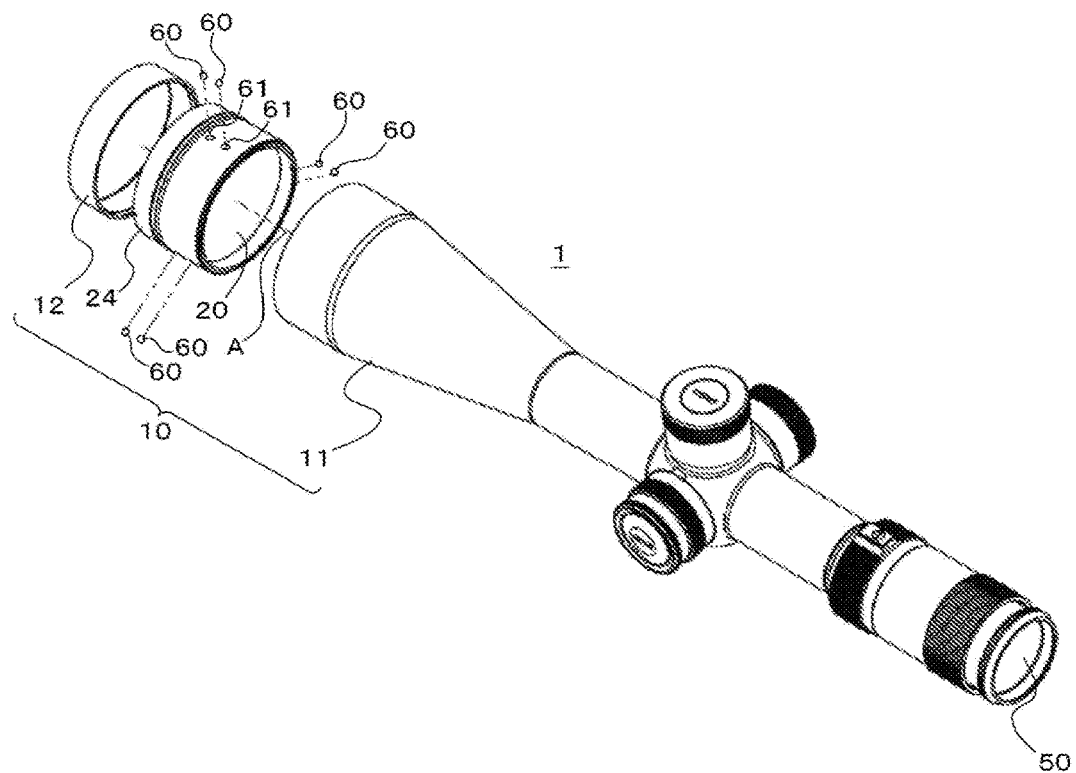
FIG. 2 is an exploded perspective view showing an optical sight according to an embodiment of the present invention.

As shown in FIG. 2, the objective lens 20 is held on an inner peripheral surface of a lens frame 24 in cylindrical shape. The optical sight 1 of the embodiment is characterized by a plurality of fixing members 60 and through-holes 61 arranged at a wall section of the lens frame 24. Each of the plurality of fixing members 60 is pressed against both a barrel body 11 and the objective lens 20 through the through-hole 61. Thereby, the objective lens 20 in the lens frame 24 is directly fixed to the barrel body 11. Hereinafter, the plurality of fixing members 60 and through-holes 61 which are characteristics of the optical sight 1 of the embodiment are described in detail.

As shown in FIG. 2, six through-holes 61 are formed at the wall section of the lens frame 24. The six through-holes 61 constitute three pairs. Two through-holes 61 constituting one pair are arranged back and forth along a direction of the optical axis A. Three pairs of the through-holes 61 are evenly arranged with a change in the position by 120° along a circumferential direction of the wall section of the lens frame 24. The fixing member 60 is put into each of the six through-holes 61. The fixing member 60 is held in the through-hole 61 by a grease (not shown). Thereby, an assembly including the objective lens 20, the lens frame 24, the six fixing members 60, and other components is configured. The lens frame 24 constituting the assembly is fixed to a front end section of the barrel body 11. Furthermore, an end tube 12 is fixed to a front end section of the lens frame 24.

Figure 3:
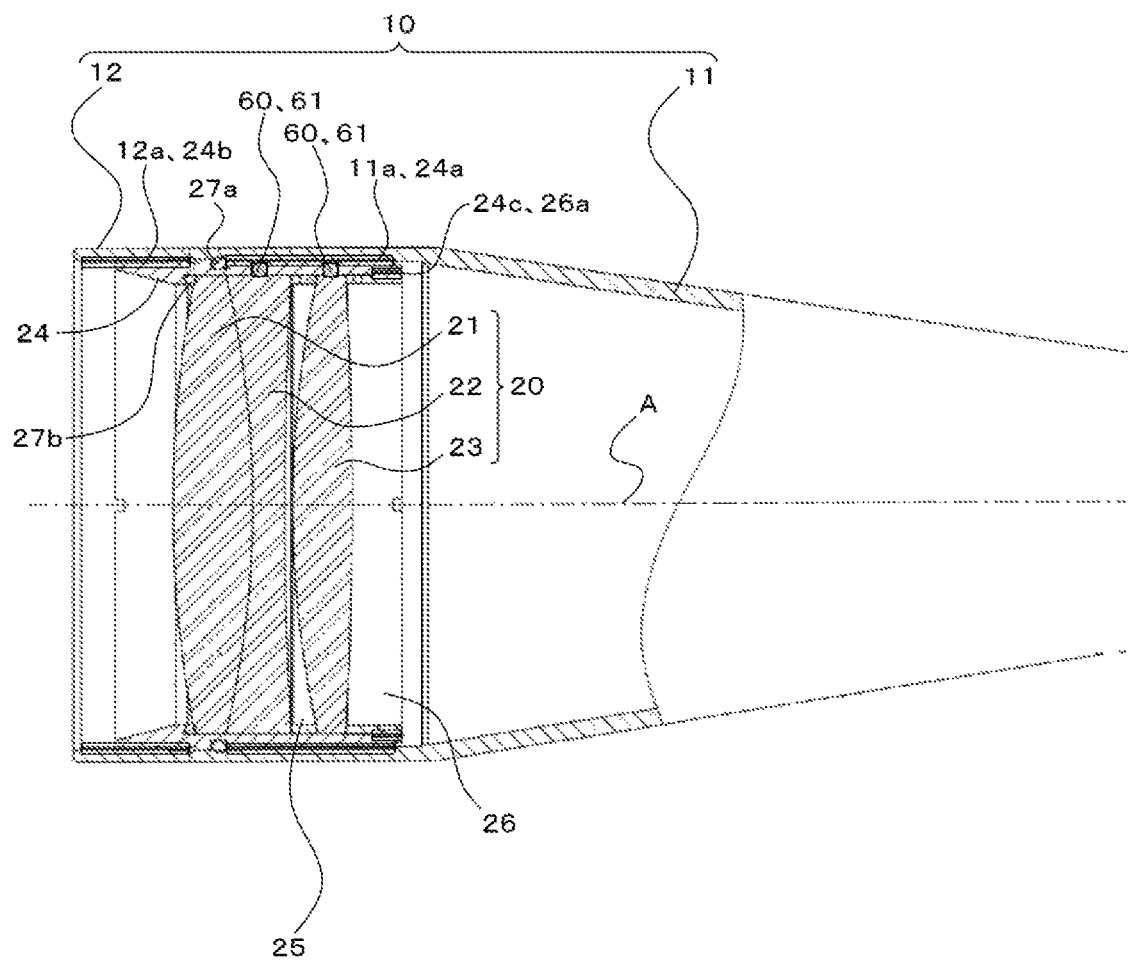
FIG. 3 is a partial cross-sectional view showing an internal structure of the optical sight of the embodiment on an objective lens side.
Figure 4:
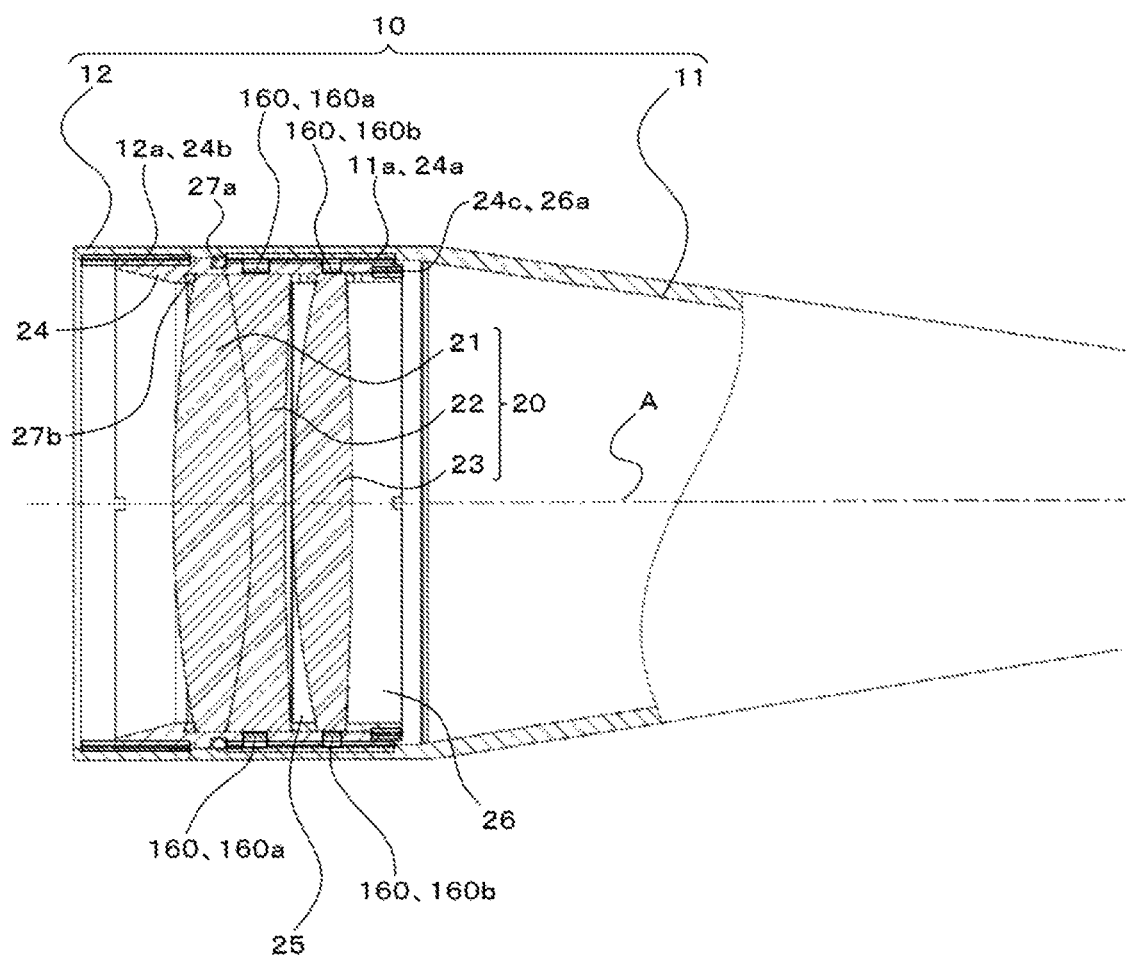
FIG. 4 is a partial cross-sectional view showing an internal structure of a conventional optical sight on the objective lens side.

FIG. 3 shows a coupling state of the barrel body 11, the lens frame 24, and the end tube 12. A first male screw 24a and a second male screw 24b are arranged on an outer peripheral surface of the lens frame 24. The second male screw 24b is located at the front end section of the lens frame 24. A concave groove is formed at the rear of the second male screw 24b. An O-ring 27a is attached to the concave groove. The first male screw 24a is continuously arranged between the rear of the concave groove and a rear end section of the lens frame 24. The first male screw 24a of the lens frame 24 is screwed into a female screw 11a of the barrel body 11. The second male screw 24b of the lens frame 24 is screwed into a female screw 12a of the end tube 12.

The six through-holes 61 penetrate the first male screw 24a of the lens frame 24. Furthermore, the positions of the six through-holes 61 correspond to the outer peripheral surface of the objective lens 20 held in the lens frame 24. More specifically, among the pairs of the through-holes 61 arranged back and forth, the position of the front through-hole 61 corresponds to the outer peripheral surface of a second lens 22, and the position of the rear through-hole 61 corresponds to the outer peripheral surface of a third lens 23.

The fixing member 60 is put into each of the six through-holes 61. The fixing member 60 is made of a metal or synthetic resin having a hardness lower than that of the barrel body 11. Furthermore, the fixing member 60 has a shape such that the fixing member 60 is capable of being put into the through-hole 61, and has a height such that the fixing member 60 is capable of being projected from the through-hole 61. For example, a cross-sectional shape of the through-hole 61 is a circle, and a shape of the fixing member 60 is a sphere having a diameter substantially the same as an inner diameter of the through-hole 61. For example, the diameter of the spherical fixing member 60 is set to a dimension slightly exceeding the depth of the through-hole 61. With this configuration, a lower part of the fixing member 60 is accommodated in the through-hole 61, and comes into contact with the outer peripheral surface of the objective lens 20 held in the lens frame 24. An upper part of the fixing member 60 slightly projects from the through-hole 61 in a direction of the first male screw 24a. For example, the diameter of the spherical fixing member 60 is set to 2 mm, the inner diameter of the circular through-hole 61 is set to 2 mm, and the depth is set to 1.7 mm. In this case, the upper part of the fixing member 60 projects 0.3 mm from the through-hole 61 in the direction of the first male screw 24a.

<Fixation of Objective Lens>

When the assembly of the objective lens 20 shown in FIG. 2 is fixed to the front end section of the barrel body 11, the grease is applied to each of the six through-holes 61 of the lens frame 24, and the fixing member 60 is put into each of the six through-holes 61. The upper part of the fixing member 60 put into the through-hole 61 is in a state of slightly projecting from the through-hole 61. In this state, the first male screw 24a of the lens frame 24 is screwed into the female screw 11a of the barrel body 11. In a process in which the first male screw 24a is completely screwed into the female screw 11a, the upper part of the fixing member 60 is scraped by the female screw 11a, and a groove that meshes with the female screw 11a is carved.

As shown in FIG. 3, among the pairs of the fixing members 60 arranged back and forth, a lower part of the front fixing member 60 comes into contact with the outer peripheral surface of the second lens 22, and the rear fixing member 60 comes into contact with the outer peripheral surface of the third lens 23. On the other hand, the upper parts of all the fixing members 60 are firmly meshed with the female screw 11a of the barrel body 11. In this way, the second lens 22 and the third lens 23 are directly fixed to the barrel body 11 via the six fixing members 60. As shown in FIG. 2, the three pairs of the fixing members 60 evenly press and support three locations on the outer peripheral surfaces of the second lens 22 and the third lens 23. Moreover, because the first lens 21 is bonded to the second lens 22 by an adhesive, the first lens 21 is fixed to the barrel body 11 via the second lens 22 and the six fixing members 60.

<Prevention of Position Deviation of Objective Lens>

The optical sight 1 of the embodiment can effectively prevent the position deviation of the objective lens 20 in the diameter direction by the plurality of fixing members 60 and through-holes 61 arranged in the lens frame 24. That is, the plurality of fixing members 60 are interposed between the objective lens 20 held in the lens frame 24 and the barrel body 11, and directly fixes the objective lens 20 to the barrel body 11. With this configuration, even if a first clearance is arranged between the objective lens 20 and the lens frame 24 and a second clearance is arranged between the first male screw 24a and the female screw 11a, the position deviation of the objective lens 20 in the diameter direction is reliably prevented by the plurality of fixing members 60.

When the optical sight 1 of the embodiment is used for a firearm such as a rifle or the like, the center of a line of sight of the reticle 40 shown in FIG. 1 is sighted so as to coincide with an impact point of the firearm (zero-in). The position deviation of the objective lens 20 in the diameter direction is effectively prevented by the plurality of fixing members 60 and through-holes 61, and as a result, the sighting of the zero-in reticle 40 is not likely to be dislocated.

<Significant Improvement in Manufacturing Efficiency>

In the conventional art, by minimizing the second clearance between the first male screw 24a and the female screw 11a, the position deviation of the objective lens 20 in the diameter direction was prevented. On the other hand, in the optical sight 1 of the embodiment, the position deviation of the objective lens 20 in the diameter direction can be effectively prevented by the plurality of fixing members 60. As a result, the range of a tolerance between the first male screw 24a and the female screw 11a is widened, and it is not necessary to strictly manage the second clearance. Thus, the optical sight 1 of the embodiment does not require actual parts matching of the first male screw 24a and the female screw 11a, and can be efficiently manufactured in large quantities.

Figure 5:
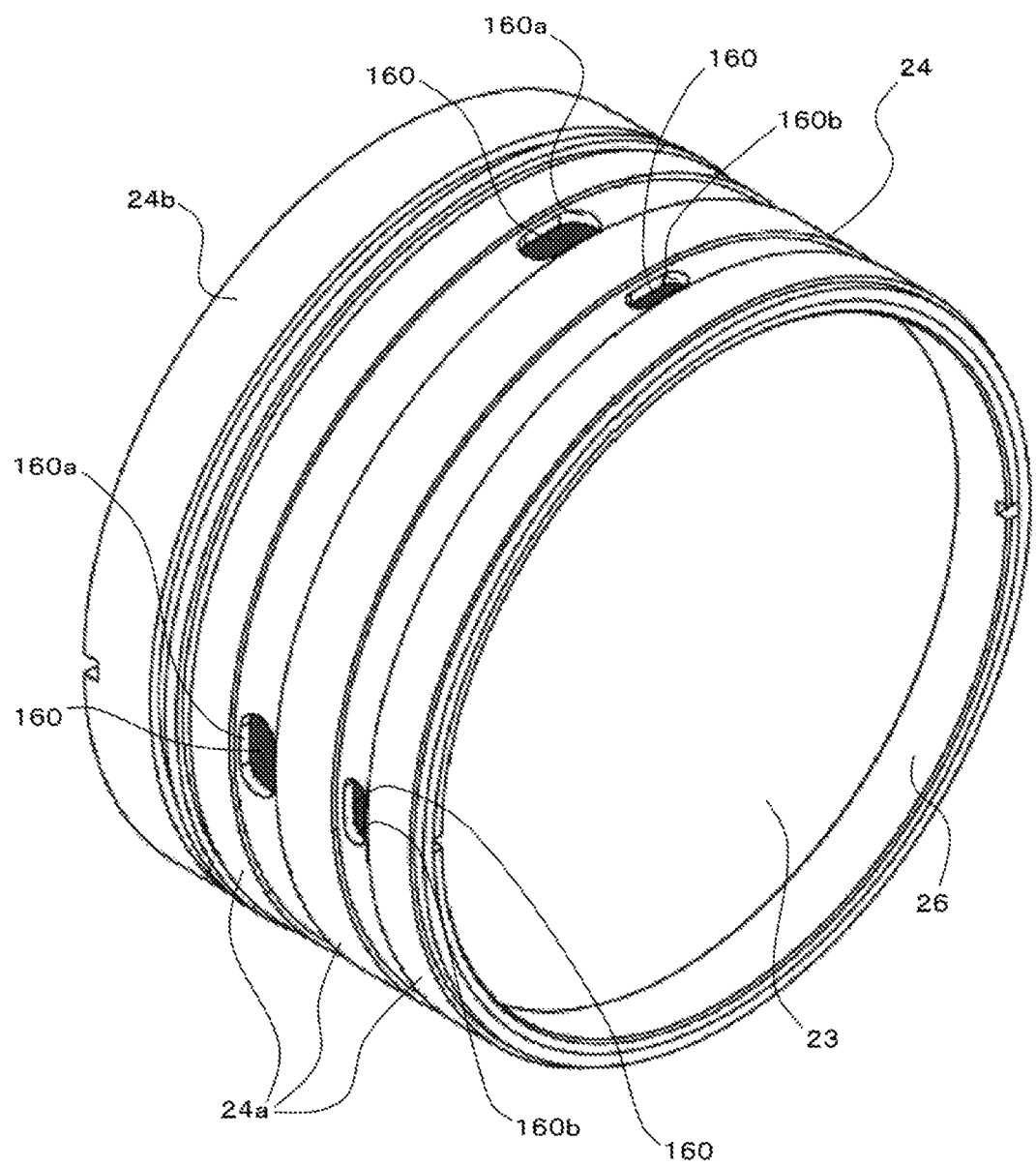
FIG. 5 is a perspective view showing an assembly of the objective lens constituting the conventional optical sight.
Figure 6:
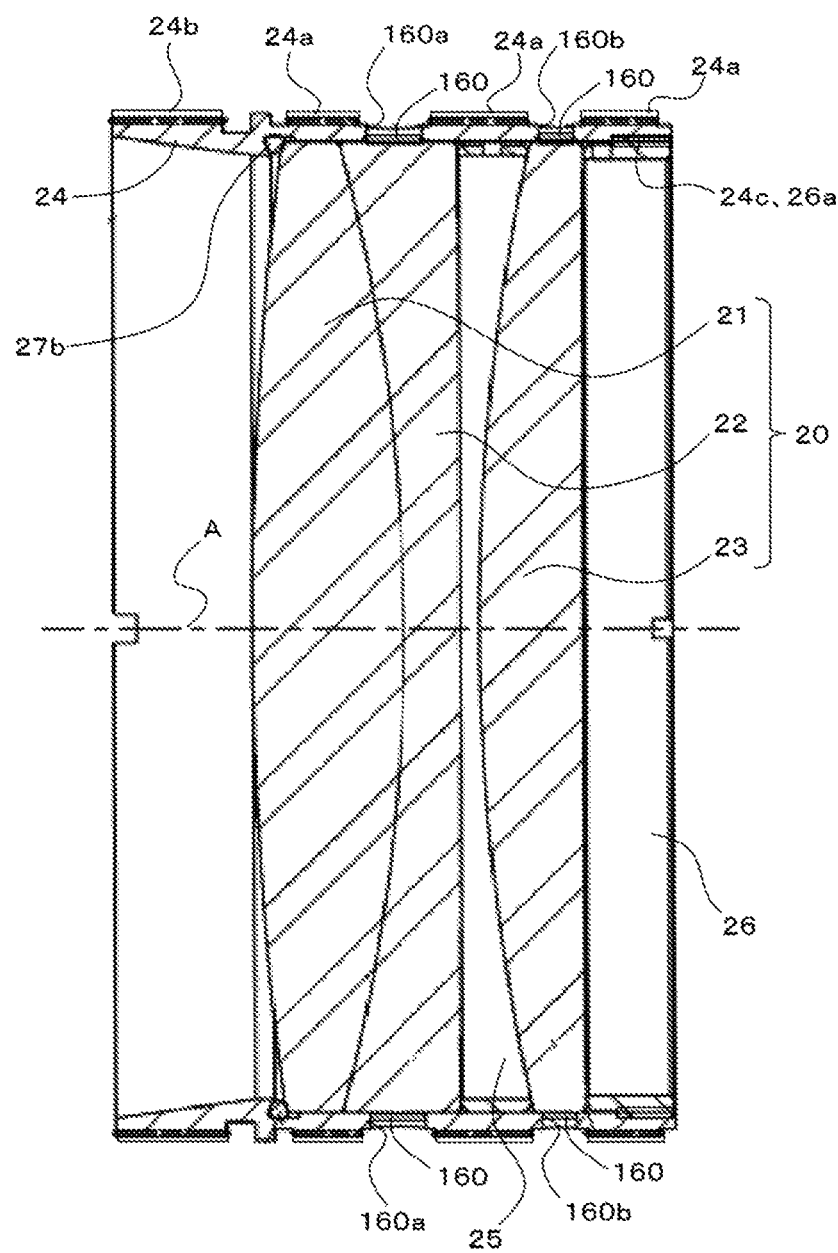
FIG. 6 is a cross-sectional view of the assembly of the objective lens shown in FIG. 5.

Furthermore, because the optical sight 1 of the embodiment can directly fix the objective lens 20 to the barrel body 11 by the plurality of fixing members 60, the adhesive 160 shown in FIG. 5 is unnecessary. As a result, in a manufacturing process of the optical sight 1 of the embodiment, it is not necessary to strictly manage the adhesive 160 in order that the adhesive 160 does not adhere to the first male screw 24a. In addition, although it takes a long time for the adhesive 160 to dry, the optical sight 1 of the embodiment does not need to wait for the adhesive 160 to dry in the manufacturing process.

<Improvement in Maintainability>

For example, dust mixed in the barrel body 11 may be removed. In this case, the assembly of the objective lens 20 can be easily separated from the barrel body 11 by releasing the screwing between the first male screw 24a and the female screw 11a. Furthermore, when the first male screw 24a and the female screw 11a are screwed again, all the existing fixing members 60 are replaced with new ones. Thereby, the objective lens 20 is directly fixed to the barrel body 11 as before.

<Other Changes>

The optical sight of the present invention is not limited to the configuration of the above-described embodiment. For example, the cross-sectional shape of the through-hole is not limited to a circle. The shape of the fixing member is also not limited to a sphere. The cross-sectional shape of the through-hole can be changed to, for example, an oval, an ellipse, a polygon, or the like. On the other hand, it is sufficient if the fixing member has a shape such that at least the fixing member can be put into the through-hole, and the fixing member preferably has a shape corresponding to the cross-sectional shape of the through-hole.

As a material of the fixing member, a metal or synthetic resin having a hardness lower than that of a material of the barrel body 11 can be used. For example, if the material of the barrel body 11 is aluminum or a magnesium alloy, the material of the fixing member is a metal or synthetic resin having a hardness lower than that of the aluminum or magnesium alloy. The synthetic resin serving as the material for the fixing member is not particularly limited, and general-purpose engineering plastic or super engineering plastic is preferable.

The number of the plurality of fixing members and through-holes arranged in the lens frame is not particularly limited, and is preferably three or more as shown in FIG. 2. Furthermore, the plurality of fixing members and through-holes are preferably evenly located along the circumferential direction of the wall section of the lens frame.

What is claimed is:

1. An optical sight, comprising an objective lens, an upright lens, a reticle, and an eyepiece lens on an optical axis in a lens barrel, and the optical sight further comprising:
    a lens frame in cylindrical shape and a plurality of fixing members, configured for fixing the objective lens to an inside of the lens barrel;
    wherein an inner peripheral surface of the lens frame is capable of coming into contact with an outer peripheral surface of the objective lens to hold the objective lens;
    a male screw capable of being screwed into a female screw arranged on the inner peripheral surface of the lens barrel is arranged on the outer peripheral surface of the lens frame;
    a plurality of through-holes is formed at a wall section of the lens frame corresponding to the outer peripheral surface of the objective lens along a circumferential direction of the wall section;
    each of the plurality of fixing members is made of a metal or synthetic resin having a hardness lower than that of the lens barrel, and has a shape such that the fixing member is capable of being put into the through-hole and a height such that the fixing member is capable of being projected from the through-hole; and
    an assembly comprising the objective lens, the lens frame, and the plurality of fixing members is screwed into the female screw arranged on the inner peripheral surface of the lens barrel.

2. The optical sight according to claim 1, wherein
    at least three or more of the through-holes are arranged at equal intervals along the circumferential direction of the wall section of the lens frame.

3. The optical sight according to claim 1, wherein
    a cross-sectional shape of the through-hole is a circle, and
    a shape of the fixing member is a sphere having a diameter substantially the same as an inner diameter of the through-hole.

4. The optical sight according to claim 1, further comprising:
    a grease configured for holding the fixing members in the through-holes.

5. The optical sight according to claim 2, wherein
    a cross-sectional shape of the through-hole is a circle, and
    a shape of each fixing member is a sphere having a diameter substantially the same as an inner diameter of each through-hole.

6. The optical sight according to claim 2, further comprising:
    a grease configured for holding the fixing members in the through-holes.

7. The optical sight according to claim 3, further comprising:
   a grease configured for holding the fixing members in the through-holes.
8. The optical sight according to claim 5, further comprising:
   a grease configured for holding each fixing member in each through-hole.

\* \* \* \* \*